United States Patent Office 3,453,338
Patented July 1, 1969

3,453,338
FLUORINATION OF HALOGENATED ORGANIC COMPOUNDS
Royston Henry Bennett and David Walter Cottrell, Avonmouth, England, assignors to Imperial Smelting Corporation (N.S.C.) Limited, London, England, a British company
No Drawing. Filed Mar. 18, 1965, Ser. No. 440,932
Claims priority, application Great Britain, Mar. 20, 1964, 11,983/64
Int. Cl. C07c 25/12
U.S. Cl. 260—650        8 Claims

ABSTRACT OF THE DISCLOSURE

A process for producing fluorine-containing perhalogenocarbons in which a halogenocarbon containing at least one fluorine atom is reacted with a solid dry alkali metal fluoride in the absence of solvents at a pressure of 0.5–5 atmospheres between 500–650° C., the amount of fluoride being at least 16.3 times by weight that required fully to fluorinate the halogenocarbon starting material.

---

This invention relates to the fluorination of perhalogeno aromatic compounds.

In our co-pending patent application Ser. No. 329,899, filed Dec. 11, 1963 and now Patent 3,277,192 there is described a process for the preparation of fluorinated aromatic compounds in which compounds containing at least one aromatic nucleus, and carbon and halogen atoms only, are caused to react with a dry alkali metal fluoride in the absence of solvents at a temperature in the range of 300° to 750°. Pressures between 20 and 50 atmospheres were stated to be particularly convenient in carrying out these reactions. In the examples in the above-defined application an excess of about 30% of alkali metal fluoride was used over that required to fluorinate the aromatic starting material completely. From the analysis of the products it may be calculated that about 60% to 70% of the available alkali metal fluoride was reacted. In order to bring the solid alkali metal fluoride into intimate contact with the aromatic halogenocarbon it was found desirable to heat the reactants in a closed vessel having only just sufficient capacity to contain the cold reactants. Vaporisation of the organic compound in the closed vessel, upon heating to the reaction temperature caused a high presure of organic vapor to be produced and the reaction was therefore conducted under autogenous pressure in a pressure-vessel designed to withstand the said pressure.

We have now found, however, that the reaction can be carried out at a much lower pressure if this is done in accordance with the procedure set out below. This pressure may be substantially equal to or less than atmospheric pressure, or a few atmospheres above atmospheric pressure. If the reaction is carried out in accordance with the invention it may be done in low-pressure reaction equipment while still providing good yields of the desired highly-fluorinated aromatic compounds.

The invention consists in a process for producing fluorinated aromatic compounds, which comprises passing a portion of the vapor of an aromatic compound containing carbon and halogen atoms only (at least one of the halogens being other than fluorine) into a reaction zone packed with dry subdivided alkali metal fluoride, the amount of such fluoride being at least 16.3 times by weight that required fully to fluorinate the aromatic compound passed as vapor into the zone; and maintaining a pressure of 0.5 to 5 atmospheres and a temperature in the range of 500° C. to 650° C. to fluorinate the aromatic compound.

The state of physical subdivision of the fluoride (which is preferably potassium fluoride) is of some importance in the reaction. However, it is possible to carry out the reaction with powdered, granulated or pelleted fluoride.

One particular advantage of the process is that it may be carried out at atmospheric pressure.

The quantities of reagents used and the size of the reactor are so chosen that the reactor is initially substantially filled with the alkali metal fluoride and the organic vapor occupies the space between the particles of solid metal fluoride, as well as being adsorbed on to the surface of the solid alkali metal fluoride.

In one form, the process may be carried out by passing successive increments of vapor into the reaction zone and allowing each increment to react before passing the next increment in.

In an alternative method, a flow process is carried out, e.g. by packing the alkali metal fluoride into a vessel through which a continuous stream of organic vapor is passed. In this way, a continuous fluorination can be achieved until the batch of alkali metal fluoride has been substantially wholly converted to the chloride. The proportions of the various chlorofluorobenzene compounds in the product mixture may be varied by alteration of the residence time of the organic vapor in contact with the alkali metal fluoride.

It has been observed that when a small quantity of (for example) hexachlorobenzene is brought into contact with a large excess of fresh (i.e. unreacted) potassium fluoride under the conditions described above a degradation reaction takes place which is apparently caused by the the presence of traces of impurity in the potassium fluoride. This results in destruction of a proportion of the organic compounds with the formation of some carbon dioxide as the only volatile product. However, after a few small portions of hexachlorobenzene have been contacted with the fluoride this degradation ceases and the desired fluorination reaction takes place with a good yield of the required products.

It has also been found that the material of construction of the reactor plays a part in the early stages of the reaction. Constructional materials such as copper, "Monel metal" and iron cause the removal of chlorine from the chlorofluoroaromatic compounds, leading to the formation of polyphenyl aromatic compounds, e.g. decafluorobiphenyl when hexachlorobenzene is treated with potassium fluoride. The formation of such polyphenyl high boiling compounds is likely to account, in part at least, for the lack of volatile organic products formed in the initial stages of the process, when applied to the reaction of hexachlorobenzene with potassium fluoride. The use of constructional materials such as "Inconel 600" or "Nimonic 75" (i.e. alloys containing about 80% of nickel and 20% of chromium as their main constituents) or aluminum does not cause such degradation reactions.

The organic material consumed in the degradation reactions described above is very small compared with the amount of hexachlorobenzene which may be fluorinated by means of one batch of potassium fluoride, after the reagent and the inner surface of the reactor have both become conditioned.

Example No. 1 below, shows how the yield of the desirable products increases with successive additions of portions of hexachlorobenzene to a given batch of potassium fluoride.

The use of a low pressure process for this fluorination reaction confers several advantages in operation in comparison with the high-pressure or "autoclave" process. These advantages are as follows:

(1) The reactor may be readily fabricated from inexpensive standard sizes of metal tube of low wall thickness, whereas the high-pressure reactor requires specialised materials and techniques of construction.

(2) The low pressure reactor may be readily filled with the fluorinating agent and readily emptied at the end of the reaction. Processes are also known in the art by which the residual metal halides may be continuously removed with concurrent addition of new or regenerated fluorinating agent. These techniques would not be feasible under high-pressure reaction conditions.

(3) The boiling points under a pressure of one atmosphere of the products from the reaction of hexachlorobenzene with potassium fluoride have a wide range as shown in the following table:

| | B.P. at 1 atm., °C. |
|---|---|
| Hexafluorobenzene | 80 |
| Chloropentafluorobenzene | 116 |
| 1,3 - dichlorotetrafluorobenzene | 156 |
| 1,3,5 - trichlorotrifluorobenzene | 190 |
| 1,2,3,5 - tetrachlorodifluorobenzene, c. | 230 |
| Pentachlorofluorobenzene, c. | 260 |
| Hexachlorobenzene | 326 |

It is therefore facile to continually distil the lower boiling products as they are formed. This technique would not be possible with the high-pressure method of operation.

(4) When operated as a batch process, the low pressure reaction would require less frequent dismantling to remove residual metal halides than the high-pressure process, as one batch of fluorinating agent suffices for the fluorination of a series of batches of organic starting material.

The process may be illustrated by the following examples:

Example 1

200 g. of dried pulverised potassium fluoride was placed in a mild steel reactor of capacity 750 cc., a portion of 5.0 g. of hexachlorobenzene was added and the sealed vessel heated at 560° C. for 3 hours. As calculated from the ideal gas equation $PV=WRT/M$, wherein P=pressure in atmospheres, V=volume of reactor in liters, W=weight of $C_6Cl_6$ added in grams, M=molecular weight of $C_6Cl_6=285$, R=0.082 liter atmospheres per °C. per mole and T=temperature of reaction in °K., the pressure was 1.6 atmospheres. The volatile material recovered at the end of the reaction consisted of a trace of carbon dioxide only. The reaction was repeated with three more successive portions of hexachlorobenzene with the following results:

| KF (g.) | $C_6Cl_6$ (g.) | Temp. (°C.) | Time (Hrs.) | $C_6F_6$ (g.) | $C_6ClF_5$ (g.) | $C_6Cl_2F_4$ (g.) | $C_6F_5$–$C_6F_5$ (g.) | $CO_2$ |
|---|---|---|---|---|---|---|---|---|
| The same 200 g. sample | 5.0 | 560 | 3 | 0 | 0 | 0 | 0 | Trace |
| | 5.0 | 560 | 3 | 0.89 | 0.38 | 0.05 | 0.1 | Trace |
| | 5.0 | 560 | 3 | 1.38 | 0.55 | 0.08 | 0.05 | 0.0 |
| | 5.0 | 560 | 2 | 1.53 | 0.68 | 0.12 | 0.0 | 0.0 |

Example 2

100 g. of powdered potassium fluoride was placed in an 800 cc. nickel reactor and heated at 560° for periods of 40 minutes with 5 successive portions of 5 g. of hexachlorobenzene. As calculated from the ideal gas equation $PV=WRT/M$, the pressure was 1.5 atmospheres. The volatile products were recovered at the end of each 40 minute period. The 25 g. of hexachlorobenzene yielded:

| | G. |
|---|---|
| $C_6F_6$ | 3.0 |
| $C_6ClF_5$ | 4.1 |
| $C_6Cl_2F_4$ | 3.2 |
| $C_6Cl_3F_3$ | 2.0 |
| $C_6Cl_4F_2$ | 1.0 |

Example 3

500 g. of powdered potassium fluoride was placed in a 750 cc. mild steel reactor, and heated at 560° for periods of 40 minutes with 17 successive portions of 4.0 g. of hexachlorobenzene. As calculated from the ideal gas equation $PV=WRT/M$, the pressure was 1.3 atmospheres. Analysis of the product recovered from the experiments showed the following yields:

| | G. |
|---|---|
| $C_6F_6$ | 15.8 |
| $C_6ClF_5$ | 8.7 |
| $C_6Cl_2F_4$ | 1.3 |
| $C_6Cl_3F_3$ | 0.4 |

In the three examples above, the fluorinating agent remained reactive at the end of the series of additions of hexachlorobenzene.

Passage of organic material could be continued until much of the potassium fluoride had become converted to potassium chloride. The proportion of the fluoride used up should be similar in extent to that found in fluorination conducted at high-pressure.

We claim:
1. A process for the production of aromatic perhalogenocarbons containing fluorine atoms attached to the aromatic nucleus in which an aromatic compound containing carbon and halogen atoms only including at least one halogen atom other than fluorine is passed into a reaction zone packed with a solid dry alkali metal fluoride in the absence of solvents, the amount of such fluoride being at least 16.3 times by weight that required fully to fluorinate the aromatic compound present in the zone; and maintaining a pressure of 0.5–5 atmospheres and a temperature within the range of 500° to 650° C. to fluorinate the aromatic compound.

2. A process as defined in claim 1 wherein said perhalogenocarbon is a perhalogenated benzene and wherein said aromatic compound containing carbon and halogen atoms only is a perhalogenated benzene containing at least one halogen atom other than fluorine.

3. A process as claimed in claim 1, in which the fluoride is powdered.

4. A process as claimed in claim 1 carried out substantially at atmospheric pressure.

5. A process as claimed in claim 1 comprising passing successive increments of vapor into the reaction zone and allowing each increment to react before passing the next increment in.

6. A process as claimed in claim 1 in which the fluoride is potassium fluoride.

7. A process as claimed in claim 1 in which the aromatic compound is selected from hexachlorobenzene and a chlorofluorobenzene containing carbon and halogen atoms only.

8. A process as claimed in claim 1 when carried out in a vessel made from nickel/chromium or from aluminum.

References Cited

UNITED STATES PATENTS

| | | | |
|---|---|---|---|
| 3,231,625 | 1/1966 | Nyman | 260—650 |
| 2,759,026 | 8/1956 | McCleary. | |
| 3,277,192 | 10/1966 | Fielding | 260—650 |
| 3,300,537 | 1/1967 | Bennett et al. | 260—650 XR |

OTHER REFERENCES

Finger et al., Abstracts, Org. Chem. Div., XVI International Congress of Pure and Applied Chemistry, Paris, July 1957.

LEON ZITVER, *Primary Examiner.*

H. T. MARS, *Assistant Examiner.*

U.S. Cl. X.R.

260—649